US008223987B2

(12) United States Patent
Shibata et al.

(10) Patent No.: US 8,223,987 B2

(45) Date of Patent: Jul. 17, 2012

(54) ATTACHMENT STRUCTURE FOR A SOUND GENERATING APPARATUS

(75) Inventors: Kiyosei Shibata, Kobe (JP); Kiyoshi Ootani, Kobe (JP); Munekazu Yanagida, Kobe (JP); Yuichi Nakajima, Kobe (JP); Naoki Fujikawa, Nagoya (JP); Koichi Toyama, Kariya (JP)

(73) Assignees: Fujitsu Ten Limited, Kobe (JP); Toyoda Boshoku Corporation, Kariya (JP)

( * ) Notice: Subject to any disclaimer, the term of this patent is extended or adjusted under 35 U.S.C. 154(b) by 782 days.

(21) Appl. No.: 12/225,063

(22) PCT Filed: Feb. 7, 2007

(86) PCT No.: PCT/JP2007/000064

§ 371 (c)(1), (2), (4) Date: Sep. 12, 2008

(87) PCT Pub. No.: WO2007/108199

PCT Pub. Date: Sep. 27, 2007

(65) Prior Publication Data

US 2009/0103748 A1 Apr. 23, 2009

(30) Foreign Application Priority Data

Mar. 15, 2006 (JP) ................................ 2006-071460

(51) Int. Cl.

*H04R 1/02* (2006.01)

*H05K 5/00* (2006.01)

(52) U.S. Cl. .......................... 381/87; 381/386; 181/150

(58) Field of Classification Search .................. 381/162, 381/389, 395, 87, 86, 386, 152; 181/150; 411/349, 412

See application file for complete search history.

(56) References Cited

U.S. PATENT DOCUMENTS

| | | | | |
|---|---|---|---|---|
| 4,852,178 | A * | 7/1989 | Inkman et al. | 381/395 |
| 5,231,659 | A * | 7/1993 | Abraham et al. | 379/433.03 |
| 5,867,583 | A * | 2/1999 | Hazelwood et al. | 381/395 |
| 6,061,460 | A * | 5/2000 | Seo | 381/388 |

(Continued)

FOREIGN PATENT DOCUMENTS

CN 1486580 A 3/2004

(Continued)

OTHER PUBLICATIONS

Japanese Office Action issued in Japanese Patent Application No. 2006-071460 dated Feb. 15, 2011 (with translation).

(Continued)

*Primary Examiner* — Vivian Chin

*Assistant Examiner* — Andrew Graham

(74) *Attorney, Agent, or Firm* — Oliff & Berridge, PLC

(57) ABSTRACT

An object is to enhance workability in attachment in a sound generating apparatus that generates sound by vibrating a vibration plate with a vibrator while ensuring acoustic performance as good as that achieved by fastening with fine screw threads. Workability in attaching operation is improved while ensuring acoustic performance as good as that provided by fastening with fine screw threads, by providing first fixing portion that brings engagement portions into screw engagement with each other by rotation by a predetermined angle that can be attained by a user without taking his/her hand that holds a coupler off it and second fixing portion for fixing the coupler to a bracket so as to prevent the coupler from rotating relative to said bracket in a direction to loosen the engagement achieved by said first fixing portion.

11 Claims, 6 Drawing Sheets

2 3 33 33 32 34 35 4 21 42 21 41

U.S. PATENT DOCUMENTS

| | | | | |
|---|---|---|---|---|
| 6,876,753 | B2 * | 4/2005 | Kim | 381/386 |
| 6,929,226 | B1 * | 8/2005 | Philistine | 248/222.52 |
| 7,050,593 | B1 | 5/2006 | Emerling et al. | |
| 7,177,438 | B2 * | 2/2007 | Iwaya et al. | 381/389 |
| 7,181,040 | B2 | 2/2007 | Ohta | |
| 7,298,863 | B2 * | 11/2007 | Kirihara et al. | 381/389 |
| 7,372,968 | B2 * | 5/2008 | Buos et al. | 381/152 |
| 7,440,582 | B2 * | 10/2008 | Hager et al. | 381/389 |
| 7,853,025 | B2 * | 12/2010 | Sleboda et al. | 381/86 |
| 7,940,948 | B2 * | 5/2011 | Campbell, Jr. | 381/386 |
| 2002/0054690 | A1 | 5/2002 | Buos et al. | |
| 2003/0019990 | A1 | 1/2003 | Iinuma et al. | |
| 2004/0170298 | A1 | 9/2004 | Ohta | |
| 2005/0147271 | A1 * | 7/2005 | Shain | 381/386 |
| 2007/0030985 | A1 * | 2/2007 | Cheung | 381/152 |
| 2007/0133816 | A1 * | 6/2007 | Horrall et al. | 381/73.1 |
| 2008/0285769 | A1 | 11/2008 | Toyama et al. | |

FOREIGN PATENT DOCUMENTS

| | | |
|---|---|---|
| EP | 1 210 846 B1 | 7/2005 |
| JP | B2-2543956 | 7/1996 |
| JP | A-10-023584 | 1/1998 |
| JP | A-2003-116190 | 4/2003 |
| JP | A-2003-154899 | 5/2003 |
| JP | A-2004-266424 | 9/2004 |
| JP | A-2005-006155 | 1/2005 |
| JP | A-2005-020462 | 1/2005 |
| JP | A-2005-311500 | 11/2005 |
| JP | A-2006-115167 | 4/2006 |
| JP | A-2006-180368 | 7/2006 |
| WO | WO 2004/039636 A1 | 5/2004 |
| WO | WO 2005/102780 A1 | 11/2005 |
| WO | WO 2005102780 A1 * | 11/2005 |

OTHER PUBLICATIONS

Jul. 12, 2011 Office Action issued in Chinese Patent Application No. 200780008769.6 (with English Translation).

Apr. 16, 2012 Chinese Office Action issued in Chinese Patent Application No. 200780008769.6 (with translation).

* cited by examiner

[Fig. 2]
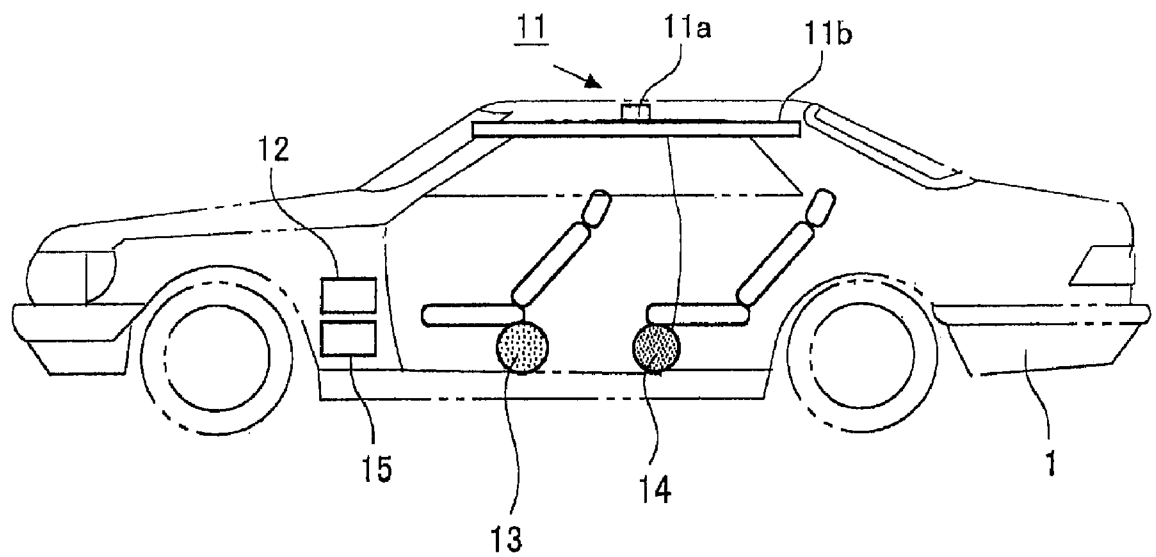
[Fig. 3]
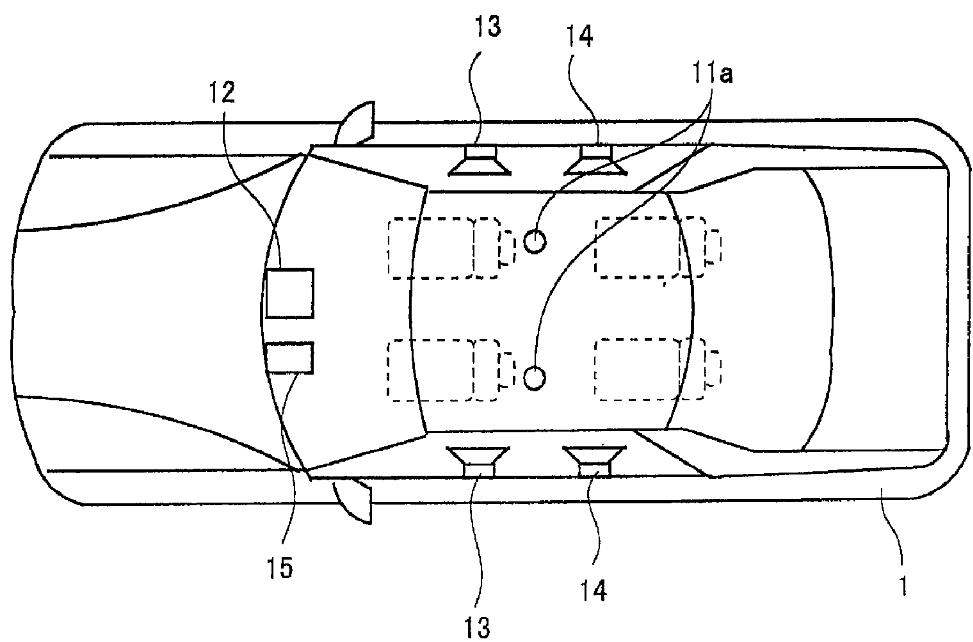

[Fig. 4]
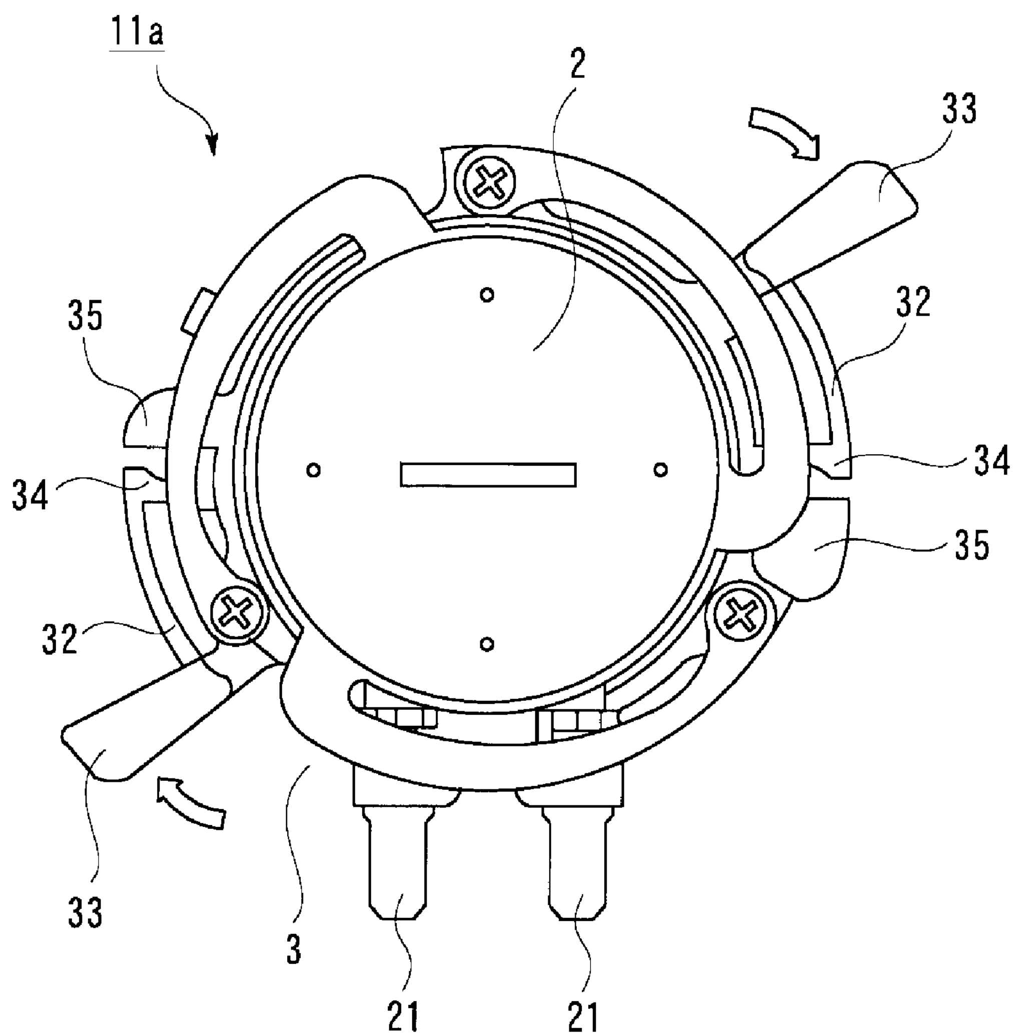
[Fig. 5]
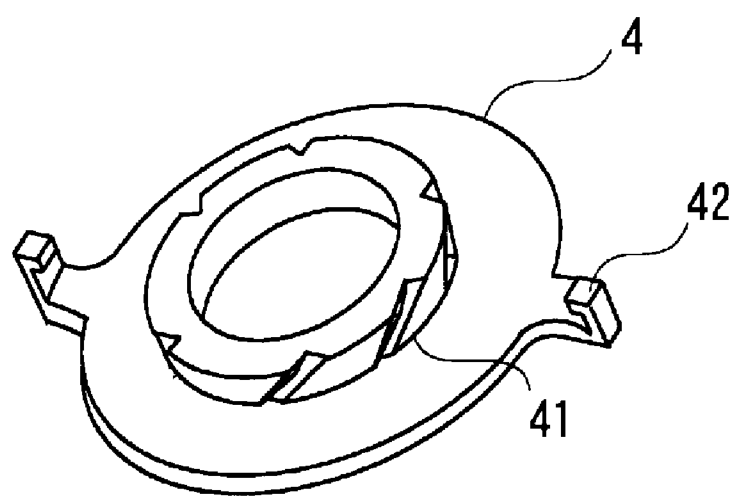

[Fig. 6]
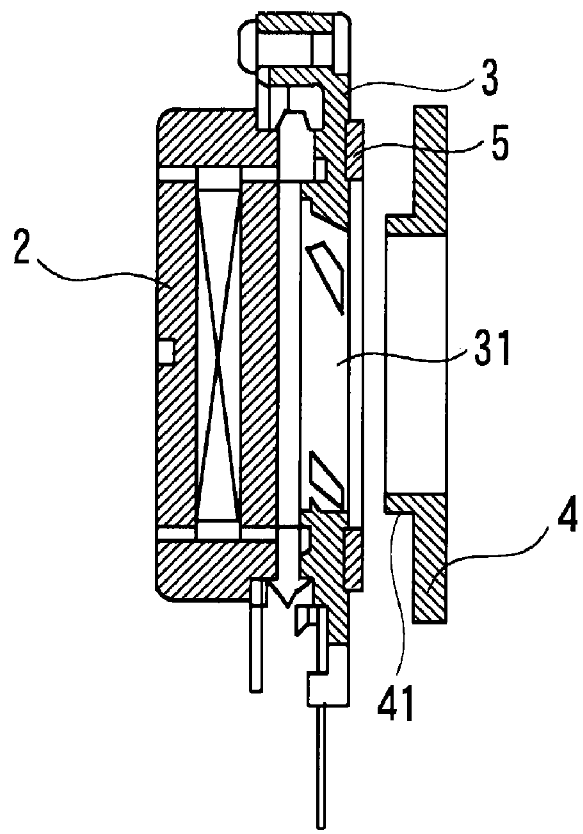
[Fig. 7]
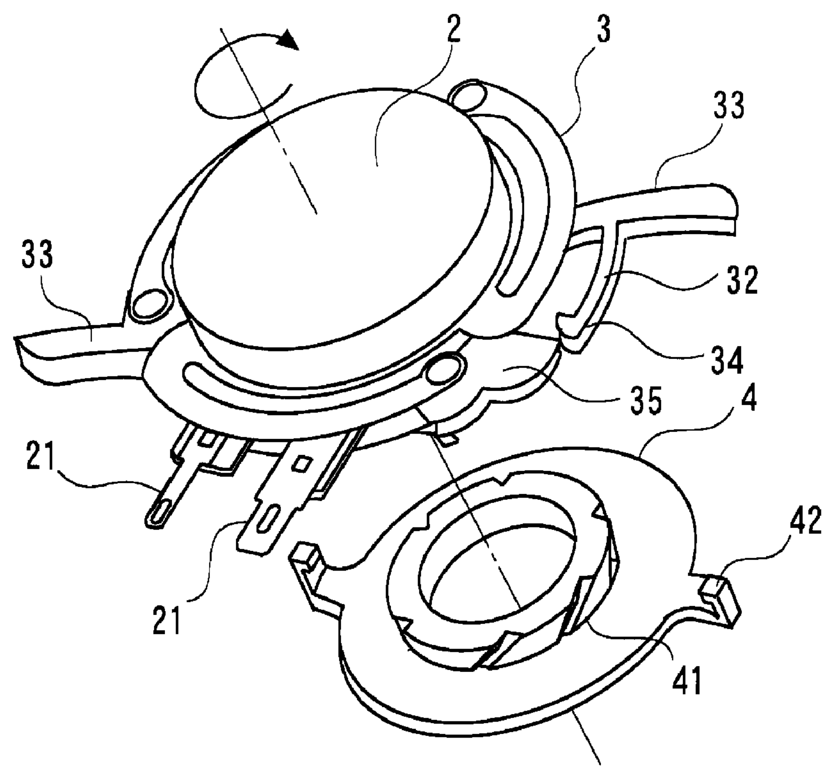

[Fig. 8]
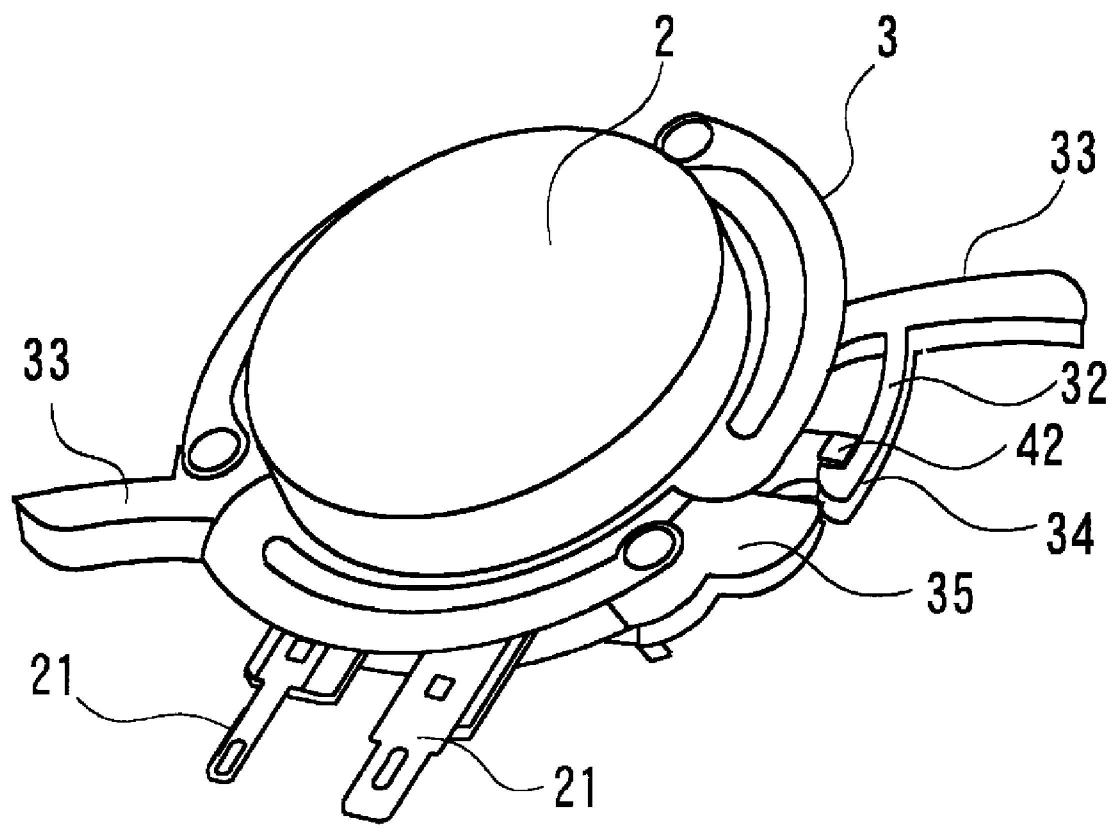

[Fig. 9]
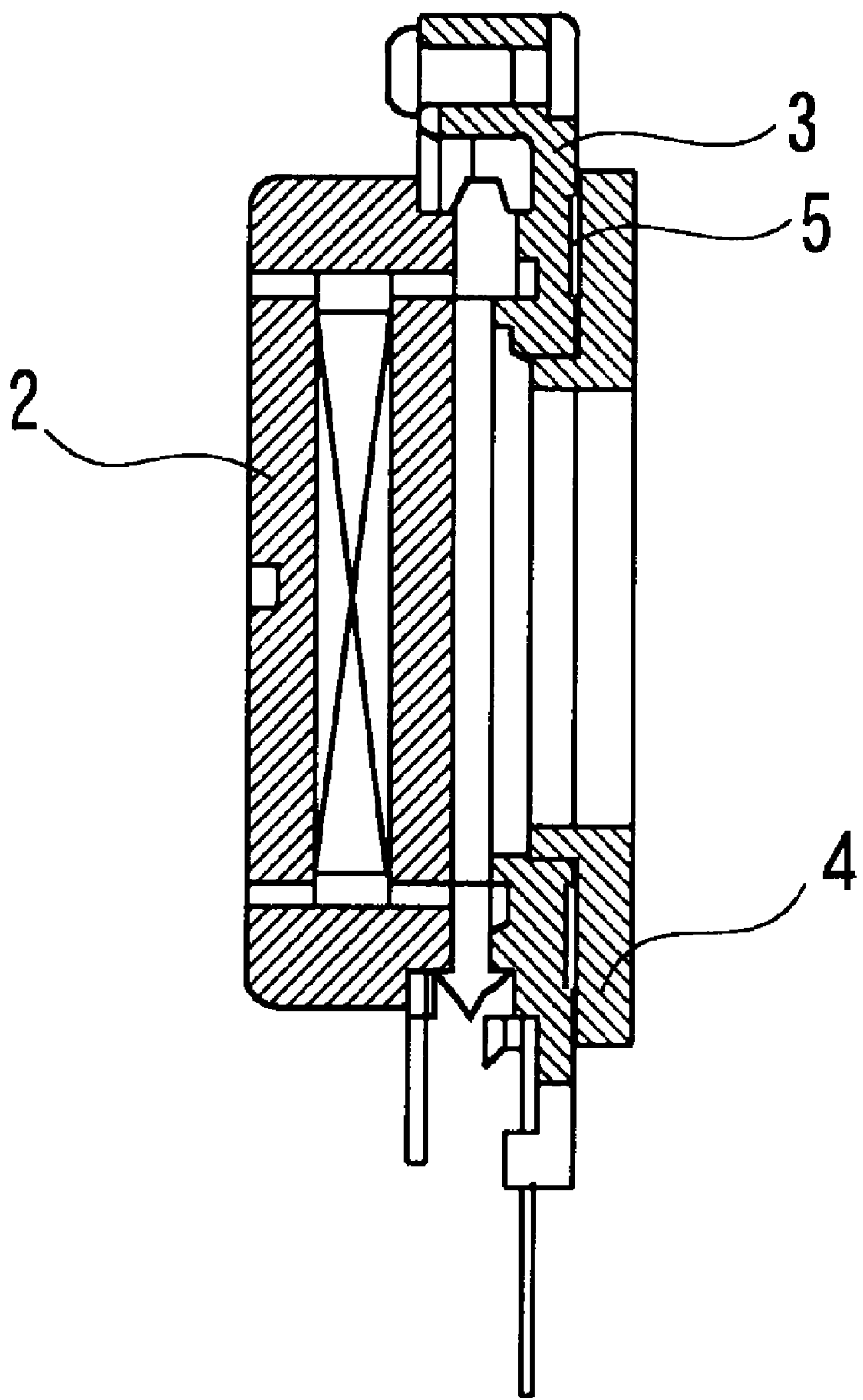

ATTACHMENT STRUCTURE FOR A SOUND GENERATING APPARATUS

TECHNICAL FIELD

The present invention relates to a sound generating apparatus for generating sound.

BACKGROUND ART

In a sound generating apparatus that generates sound by transmitting vibration of a vibrator to a vibration plate (or diaphragm), according to a conventional method of attaching the vibrator to the vibration plate, fine screw threads are used as shown in FIG. 1. A female fine screw thread portion 61 provided on a coupler 6 is screwed approximately three turns with a male fine screw thread portion 71, whereby the coupler 6 is fixed to the bracket 7. With the screw coupling force, the coupler 6 and the bracket 7 are kept in close contact with each other, so that vibration of the vibrator can be transmitted to the vibration plate with high efficiency.

As an alternative to attachment using fine screw threads, a method of attaching a vibrator to a vibration plate using elastically deformable projections engaging with each other has been known (see Patent Document 1 referred to below).

As a method of attaching a finished speaker to a vehicle, which is different from attaching a vibrator to a vibration plate to finish a speaker first, there is a method of attaching a general cone speaker to a vehicle by bringing the speaker into contact with a bracket and then fixing it by sliding it (see Patent Documents 2 to 5 listed below).

Japanese Patent Application Laid-Open No. 2005-20462
Japanese Patent Application Laid-Open No. 2003-116190
Japanese Patent Application Laid-Open No. 2003-154899
Japanese Patent Application Laid-Open No. 2005-6155
Japanese Patent Application Laid-Open No. 2004-266424

DISCLOSURE OF INVENTION

Technical Problem

In vibration plate direct drive speakers in which a vibration plate is vibrated by a vibrator (which is generally called an exciter), its acoustic performance is closely related to means for attaching a coupler with a bracket, and therefore attaching means with high transmission efficiency is required.

In view of this, attaching means that fastens them by screwing fine screw threads approximately three turns has been conventionally used. However, its workability in the attaching operation is low, since it is necessary for the operator to take his/her holding hand off the coupler several times during the attaching operation.

There also are methods that do not use fastening with fine screw threads as attaching means, as exemplified by an engagement method using elastic parts and a sliding method that is used in attaching a finished speaker. However, these methods are inferior in realizing good acoustic performance, since vibration transmission efficiency achieved by them is low as compared to that achieve by fastening with fine screw threads. Thus, it has been difficult to achieve both ease of attachment and good acoustic performance. In this respect, the situation is different from the case of attaching a finished speaker.

In view of the above described problem, an object of the present invention is to enhance workability in attachment in a sound generating apparatus that generates sound by vibrating a vibration plate with a vibrator while ensuring acoustic performance as good as that achieved by fastening with fine screw threads.

Technical Solution

To achieve the above described problem, the present invention improves workability in attaching operation while ensuring as good acoustic performance as that achieved by fastening with fine screw threads by providing first fixing means that allows a user to screw an engagement portion without taking his/her hand that holds the coupler off it and second fixing means for fixing the engagement portion so as to prevent the engagement portion from rotating in the direction to loosen the engagement achieved by said first fixing means.

Specifically, according to the present invention, there is provided a sound generating apparatus comprising a coupler having a vibrator, a bracket attached to a vibration plate, first fixing means for bringing said coupler and said bracket into engagement with each other through screw-like engagement portions having such a pitch that screwing is completed by rotation of said coupler by a predetermined angle that can be attained by a user without taking his/her hand that holds said coupler off it, and second fixing means for fixing said coupler to said bracket so as to prevent said coupler from rotating relative to said bracket in a direction to loosen the screw engagement from the position screwed by said predetermined angle by said first fixing means.

Said vibrator is a device that vibrates based on an audio signal. When vibration of the vibrator is transmitted to a vibration plate, the vibration plate vibrates, so that sound is generated. The coupler having the vibrator is fixed on the bracket having the vibration plate to constitute the sound generating apparatus.

The first fixing means brings said coupler and said bracket into engagement with each other by a screw-like engagement portion that screws through rotation by a predetermined angle that can be attained by a user without taking his/her hand that holds said coupler off it. Specifically, said coupler and said bracket have screw-like engagement portions having a pitch with which screwing is attained with said predetermined rotation angle. Thanks to screwing of the engagement portions with said predetermined rotation angle, the operation that has conventionally required about three rotations is completed only by a single turning of the wrist. Thus, workability in the attaching operation is improved.

The second fixing means is adapted to fix said coupler to said bracket so as to prevent said coupler from rotating relative to said bracket in a direction to loosen the screw engagement from the position screwed by said predetermined angle in said first fixing means. By fixing the coupler so as to prevent it from rotating in the direction to loosen the screw engagement, it prevents disconnection of the coupler and maintains screwing by said first fixing means.

The attaching operation is completed by rotation of the coupler by the predetermined angle that can be attained by a user without taking his/her hand that holds said coupler off it, wherein the second fixing means restricts rotation of the coupler relative to the bracket after screwing by said first fixing means. By sliding the screw-like engagement portions in the circumferential direction and the axial directions in a state in which helical grooves and helical ridges of the screw-like engagement portions are mated with each other to attain screw coupling and maintaining it by the second fixing means, it is possible to obtain a fastening force as strong as and acoustic performance as good as those achieved by conventional fine screw threads.

In the present invention, the predetermined angle in said first fixing means may be an angle within a range from 15 to 90 degrees.

When said predetermined angle is larger than or equal to 15 degrees, a screw engagement force required in ensuring good acoustic performance can be provided in the present invention. When said predetermined angle is smaller than or equal to 90 degrees, the load on the user's wrist in the attaching operation can be kept low. However, an angle smaller than 15 degrees or larger than 90 degrees can be included in said predetermined range as long as said required screw engagement force and the effect of relieving the load on the wrist are achieved.

In the present invention, said second fixing means may fix said coupler to said bracket by engagement of claw-like engagement portions with each other in a circumferential direction about a center on the screw axis in said first fixing means.

The engagement of the claw-like engagement portions with each other in a circumferential direction about a center on the screw axis prevents disconnection of the coupler that may be caused by rotation of the coupler relative to the bracket in the direction to loosen the screw engagement. While vibration of the vibrator is mainly directed in the axial direction, the engagement is achieved in the circumferential direction. Therefore, the load on the engagement portion applied by vibration is low. This is advantageous in preventing wear and breakage of the claw-like engagement portions. Furthermore, since the claw-like engagement portions engage with each other at the time when rotation by the predetermined angle in said first fixing means is achieved, the user can feel the completion of attachment. Thus, workability in the attaching operation is improved.

In the present invention, said claw-like engagement portions may be made of a metal having elasticity and insert-molded in said coupler or said bracket.

By making said claw-like engagement portions using a metal material having elasticity and insert-molding it in the coupler or the bracket, the strength of the engagement portions is enhanced. Accordingly, it is possible to prevent breakage of the engagement portions at the time of attachment, after attachment and at the time of disconnection, while the function of the second fixing means is carried out by engagement of the claw-like engagement portions with each other.

In the present invention, at least one of said claw-like engagement portions may comprise an arm extending from said coupler or said bracket in the circumferential direction about a center on the screw axis in said first fixing means and a claw at an end of the arm, and the coupler or the bracket that has said arm may have a projection provided in the vicinity of the end of said arm in the engaging direction of said claw-like engagement portion.

Said claw-like engagement portion may be constructed as an arm extending in the circumferential direction about a center on the screw axis in said first fixing means and a claw at an end of the arm. In this case, by providing a projection in the vicinity of the end of said arm in the engaging direction of said claw-like engagement portion, it is possible to prevent the arm or the claw at the end of the arm from being broken by an impact thereon.

The sound generating apparatus according to the present invention may further comprise an elastic member that biases, in a state in which said coupler is fixed to said bracket, said coupler and said bracket relatively away from each other in the axial direction of screwing of said screw-like engagement portions.

Since the elastic member is compressed in the axial direction in the state in which the coupler is fixed to the bracket, the elastic member biases the coupler and the bracket relatively away from each other along the axial direction in screwing of said screw-like engagement portions. This enhances the efficiency of transmission of vibration from the vibrator to the vibration plate and makes it possible to ensure improved acoustic performance.

Advantageous Effects

According to the present invention, it is possible to enhance workability in attachment in a sound generating apparatus that generates sound by vibrating a vibration plate with a vibrator while ensuring acoustic performance as good as that achieved by fastening with fine screw threads.

BRIEF DESCRIPTION OF THE DRAWINGS

FIG. 2 is a side view schematically showing a configuration of an embodiment according to the present invention implemented as an in-vehicle speaker.

FIG. 3 is a top view schematically showing the configuration of the embodiment according to the present invention implemented as an in-vehicle speaker.

FIG. 4 schematically shows the structure of an exciter according to the embodiment of the present invention.

FIG. 5 schematically shows the structure of a bracket according to the embodiment of the present invention.

FIG. 6 is a cross sectional view schematically showing the exciter and the bracket according to the embodiment of the present invention.

FIG. 7 illustrates how the exciter is attached to the bracket in the embodiment of the present invention.

FIG. 8 schematically shows the structure according to the embodiment of the present invention after the exciter has been attached to the bracket.

FIG. 9 is a cross sectional view schematically showing the structure according to the embodiment of the present invention after the exciter has been attached to the bracket.

BEST MODE FOR CARRYING OUT THE INVENTION

Figure 1:
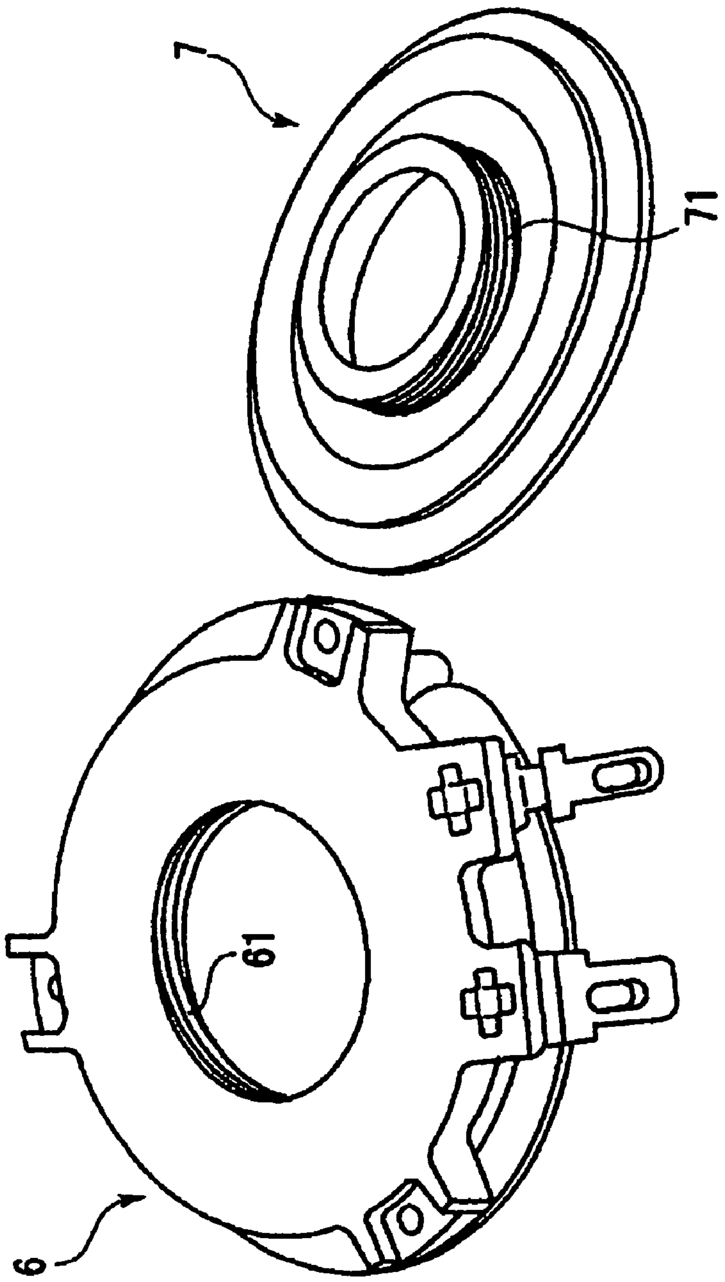
FIG. 1 schematically shows the structure of a plate direct drive speaker according to a prior art.

In the following, a description will be made of a case where the present invention is implemented in a speaker mounted on a motor vehicle with reference to the drawings.

First Embodiment

FIGS. 2 and 3 illustrate a sound generating apparatus 11 according to a first embodiment of the present invention, in which an exciter 11*a* is attached on a top panel 11*b* in the interior of a vehicle 1. The exciter 11*a* is generally used as a part of a car audio system in combination with a head unit 12, front speakers 13, rear speakers 14 and an amplifier 15 etc. The head unit 12 outputs an audio signal. The audio signal output is amplified through the amplifier 15 and then input to the exciter 11*a*. The exciter 11*a* vibrates based on the audio signal input thereto, and the vibration is transmitted to the top panel 11*b* to vibrate the top panel 11*b*, whereby sound is heard in the interior of the vehicle 1. The head unit 12 outputs audio signals also to the front speakers 13 and the rear speakers 14. Thus, a sound space is formed in the interior of the vehicle 1.

FIGS. 4, 5 and 6 schematically show the structure of the exciter 11*a* and a bracket 4 that constitute a sound generating apparatus 11 according to this embodiment of the present invention. FIG. 4 illustrates the exciter 11*a*, and FIG. 5 illustrates the bracket 4. The exciter 11*a* has a vibrator 2 that vibrates based on an audio signal input through electrodes 21. The vibrator 2 is attached to a coupler 3. The bracket 4 is attached to the top panel 11*b*, which serves as a vibration plate, though the vibration plate is not shown in FIGS. 4 and 5.

The coupler 3 has blade-like handles 33 serving as holding portions to be held by a user. The two handles 33 are provided on lateral sides of the coupler 3 at diametrically opposite positions to help the user in holding the coupler 3 and attaching it to the bracket 4. Although the handles 33 of the coupler 3 in this embodiment are constructed as blade-like projections, structures other than projections may be provided alternatively. For example, anti-slip structures or recesses into which fingers are to fit may be provided on the lateral side of the coupler. The holding portion provided on the coupler facilitates attachment operations that are performed manually.

The coupler 3 has a screw-like engagement portion 31 at its bottom (see FIG. 6). The engagement portion 31 is a cylindrical bore having a depth larger than or equal to 3 mm. On the inner circumferential wall of the bore are provided helical ridges having such a pitch that causes a 3 mm advancement by a 30 degree rotation. This pitch was determined with a view to allow the user to finish the rotation by turning his/her wrist once. On the top face of the bracket 4 is provided a cylindrical engagement portion 41 having helical grooves adapted to screw with the cylindrical bore of the coupler 3. How these engagement portions 31 and 41 are screwed with each other will be described later with reference to FIG. 7.

The coupler 3 has arms 32 that extend in the circumferential direction. Each arm 32 has at its end a claw 34 that projects inwardly. The bracket 4 has engagement hook 42 to engage the claws 34. The inward bending angle of the claw 34 is designed to be an acute angle so as to prevent dislocation when engaging with the engagement hook 42. How the claws 34 and the engagement hooks 42 are brought into engagement with each other will be described later with reference to FIG. 7.

In this embodiment, the arms 32 and the claws 34 are made of a material the same as the coupler 3. Alternatively, the arms 32 and the claws 34 may be made using a metal material having elasticity such as a spring steel and then insert-molded in the coupler 3. With such a structure, breakage of the arms 32 and the claws 34 can be prevented.

The coupler 3 also has protective projections 35 for protecting the claws 34. The protective projections 35 are provided in front of the leading ends of the arms 32. Thus, when some object strikes the coupler 3 externally, it first collides with the protective projection 35 before colliding with the claw 34 at the end of the arm 32, whereby breakage of the arm 32 or the claw 34 is prevented. The protective projections 35 are designed to be provided at positions at which they do not come in contact with the engagement hooks 42 of the bracket 4 when the bracket 4 is attached so as not to interfere with the attaching operation.

An annular spacer 5 having elasticity is provided in the circumference of the engagement portion 31 on the bottom of the coupler 3 (see FIG. 6). In this embodiment, the spacer 5 is adhered to the coupler 3 in advance. Alternatively, the spacer 5 may be adhered to the bracket 4, or it may be prepared as a separate part at the time of starting attachment of the coupler 3 to the bracket 4.

FIG. 7 illustrates how the coupler 3 is attached to the bracket 4. The user places his/her fingers on the handles 33 to hold the coupler 3, aligns the engagement portions 31 of the coupler 3 and the engagement portions 41 of the bracket, and turns the coupler 3 clockwise relative to the bracket 4 to screw the engagement portion 31 with the engagement portion 41. When they are screwed, the spacer 5 is compressed between the coupler 3 and the bracket 4. In addition, the claws 34 at the ends of the arms 32 come into contact with the engagement hooks 42, and the arms 32 elastically deform outwardly away from the center of the coupler 3. Upon completion of screwing by a rotation angle of 30 degrees, the elastically deformed arms 32 return to the state before deformation, whereby the engagement hooks 42 are fitted inside the claws 34. Thus, rotation in the direction to loosen the screw engagement is restricted (seen FIG. 8).

The operation of attaching the coupler 3 to the bracket 4 is finished at the time when the claws 34 engage the engagement hooks 42. The user can know completion of the attaching operation by a feeling that occurs at the time when the engagement hooks 42 fit inside the claws 34.

FIG. 9 is a cross sectional view showing the state in which attachment of the coupler 3 to the bracket 4 has been finished. In the state in which attachment of the coupler 3 to the bracket 4 has been finished, the spacer 5 is compressed to bias the coupler 3 and the bracket 4 relatively away from each other along the axial direction of the screw engagement (FIG. 9). Although the biasing by the spacer 5 acts in the direction to loosen the screw engagement, the coupler 3 will not be dislocated from the bracket 4, thanks to the engagement of the claws 34 and the engagement hooks 42. The coupler 3 and the bracket 4 are brought into close contact with each other by the biasing, which enhances vibration transmission efficiency between the vibrator 2 and the vibration plate. Thus, an excellent acoustic performance is provided.

In this embodiment, the attaching operation is completed only by holding the coupler 3 with a hand and turning the hand by 30 degrees without using a tool contrary to conventional fine screw thread structures in which it is necessary to take the hand off the coupler three times or so to change the holding position in screwing the coupler. This is particularly advantageous in production lines in which a large amount of attaching operations are to be performed. In addition, this embodiment provides performance represented by frequency characteristics as good as that achieved by fine screw thread structures.

Although the rotation angle in the attaching operation is 30 degrees in this embodiment, this angle may be appropriately selected from the range of 15 to 90 degrees. When this angle is larger than or equal to 15 degrees, a screw engagement force enough to ensure good acoustic performance is achieved, and when this angle is smaller than or equal to 90 degrees, the load on the users wrist in the attaching operation can be kept low. However, the aforementioned range of 15 to 90 degrees is an exemplary part of the angle range with which the problem addressed by the present invention can be solved, and the present invention is not limited by the aforementioned range. An angle outside the aforementioned range is also acceptable as long as the user can turn the coupler 3 by that angle without taking his/hand off the coupler 3 and required acoustic performance is ensured.

Second Embodiment

In the structure like the first embodiment, the positions at which the arms and the claws are provided and the positions at which the engagement hooks are provided may be reversed. Thus, the bracket has arms extending in the circumferential direction on its lateral side, and each arm has at its end a claw that projects inwardly. In said screwing operation, when the user screws the coupler by 30 degrees from the starting position of the screw mating, the claws engage with the engagement hooks provided on the coupler.

Third Embodiment

As an alternative to the engagement provided by the claws and the engagement hooks in the structure like the first embodiment, screw holes corresponding to each other may be provided on the coupler and the bracket, and the coupler and the bracket may be fastened by a screw in the state the screw-mating engagement portions have been screwed together by 30 degrees. With the use of a screw as fixing means, attachment can be easily finished only by screwing the screw using a general-purpose tool.

Alternatively, the coupler and the bracket may be adhered to each other using an adhesive after the screw-mating engagement portions have been screwed together by 30 degrees, or some of the engagement methods using claws and engagement hooks according to the first and the second embodiments and the screwing method and the adhesion method using an adhesive according to this embodiment may be used in combination. Decoupling can be performed easily except for in the adhesion method, and it is possible to improve ease of maintenance of the apparatus.

Forth Embodiment

In the structure like the first embodiment, the male and female screw threaded engagement portions may be reversed. Thus, an engagement portion provided on the top face of the bracket is in the form of a cylindrical bore having a depth larger than 3 mm, and helical ridges having such a pitch that causes a 3 mm advancement by a 30 degree rotation are provided on the inner circumferential wall of the bore. On the bottom face of the coupler is provided a cylindrical engagement portion having helical grooves adapted to screw with the cylindrical bore of the bracket. The user holds the coupler 3, then brings the engagement portions into contact with each other and screws them together.

What is claimed is:

1. An attachment structure for a sound generating apparatus comprising:

a coupler secured to a vibrator;

a bracket attached to a vibration plate;

first fixing means for bringing the coupler and the bracket into engagement with each other through screw-like engagement portions having such a pitch that screwing is completed by rotation of the coupler along a spiral which is inclined with respect to a screw axis by a predetermined angle that can be attained by a single turning of a user's wrist without taking the user's hand that holds the coupler off it; and second fixing means for fixing the coupler to the bracket so as to prevent the coupler from rotating relative to the bracket in a direction to loosen the screw engagement from the position screwed by the predetermined angle by the first fixing means, wherein the second fixing means fixes the coupler to the bracket by engagement of claw-like engagement portions with each other in a circumferential direction about the screw axis in the first fixing means.

2. The attachment structure for a sound generating apparatus according to claim 1, wherein the claw-like engagement portions are made of a metal having elasticity and insert-molded in the coupler or the bracket.

3. The attachment structure for a sound generating apparatus according to claim 1, wherein at least one of the claw-like engagement portions comprises an arm extending from the coupler or the bracket in a circumferential direction about a center on the screw axis in the first fixing means and a claw at an end of the arm, and the coupler or the bracket that has the arm has a projection provided in the vicinity of the end of the arm in the engaging direction of the claw-like engagement portion.

4. The attachment structure for a sound generating apparatus according to claim 1 further comprising an elastic member that biases, in a state in which the coupler is fixed to the bracket, the coupler and the bracket away from each other in the axial direction of screwing of the screw-like engagement portions.

5. The attachment structure for a sound generating apparatus according to claim 2, wherein at least one of the claw-like engagement portions comprises an arm extending from the coupler or the bracket in a circumferential direction about a center on the screw axis in the first fixing means and a claw at an end of the arm, and the coupler or the bracket that has the arm has a projection provided in the vicinity of the end of the arm in the engaging direction of the claw-like engagement portion.

6. The attachment structure for a sound generating apparatus according to claim 1 further comprising an elastic member that biases, in a state in which the coupler is fixed to the bracket, the coupler and the bracket away from each other in the axial direction of screwing of the screw-like engagement portions.

7. The attachment structure for a sound generating apparatus according to claim 2 further comprising an elastic member that biases, in a state in which the coupler is fixed to the bracket, the coupler and the bracket away from each other in the axial direction of screwing of the screw-like engagement portions.

8. The attachment structure for a sound generating apparatus according to claim 3 further comprising an elastic member that biases, in a state in which the coupler is fixed to the bracket, the coupler and the bracket away from each other in the axial direction of screwing of the screw-like engagement portions.

9. The attachment structure for a sound generating apparatus according to claim 5 further comprising an elastic member that biases, in a state in which the coupler is fixed to the bracket, the coupler and the bracket away from each other in the axial direction of screwing of the screw-like engagement portions.

10. The attachment structure for a sound generating apparatus according to claim 1, wherein the predetermined angle in the first fixing means is an angle within a range from 15 to 90 degrees.

11. The attachment structure for a sound generating apparatus according to claim 1, further comprising:

a protective projection located on the coupler near the claw-like engagement portions.

* * * * *

UNITED STATES PATENT AND TRADEMARK OFFICE

CERTIFICATE OF CORRECTION

PATENT NO. : 8,223,987 B2
APPLICATION NO. : 12/225063
DATED : July 17, 2012
INVENTOR(S) : Kiyosei Shibata et al.

It is certified that error appears in the above-identified patent and that said Letters Patent is hereby corrected as shown below:

In Item (73) on the cover page, please delete the following

"(73) TOYODA BOSHOKU CORPORATION"

and Replace with the following:

(73) TOYOTA BOSHOKU CORPORATION

Signed and Sealed this
Twenty-second Day of January, 2013

David J. Kappos
*Director of the United States Patent and Trademark Office*